Patented Apr. 20, 1954

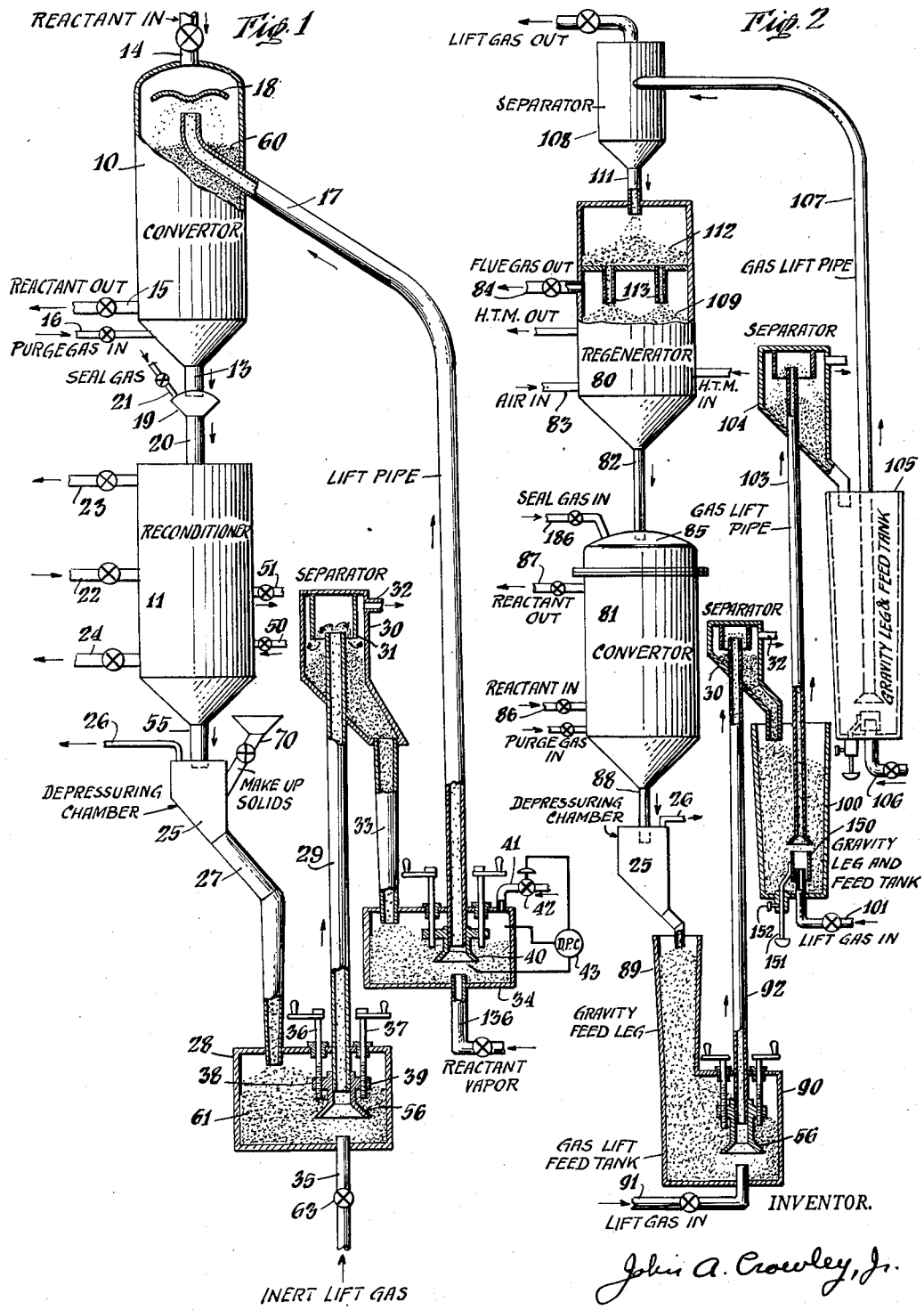

2,676,142

UNITED STATES PATENT OFFICE 2,676,142

HYDROCARBON CONVERSION AND CONTACT MATERIAL TRANSFER METHOD

John A. Crowley, Jr., Scarsdale, N. Y., assignor to Socony-Vacuum Oil Company, Incorporated, a corporation of New York Application June 4, 1949, Serial No. 97,274

6 Claims. (Cl. 196—52)

This invention pertains to processes for conversion of fluid hydrocarbons in the presence of a granular contact material which may or may not be catalytic in nature. Typical of the processes to which this invention pertains are the catalytic cracking conversion, isomerization, hydrogenation, reforming, dehydrogenation aromatization, hydroforming, treating and desulfurization of petroleum fractions. Also typical are the coking, viscosity reducing of petroleum residuums and high temperature pyrolytic conversion processes such as the conversion of propane and ethane to ethylene or of methane to acetylene. In these latter processes the granular contact material serves merely as a heat carrying material.

An important commercial unit for continuously conducting reactions of this type is one wherein the granular contact material is passed cyclically through a hydrocarbon conversion and a contact material reconditioning zone in which it flows downwardly as a substantially compact column. The contact material employed in such a process may be a catalyst in the form of natural and treated clays, bauxites, inert carriers impregnated with certain catalyst active metallic oxides or synthetic associations of silica, alumina, magnesia or of combinations thereof to which may be added small amounts of metallic oxides for specific purposes. When the contact material is employed for heat carrying purposes only it may take the form of metal balls, capsules containing fusible alloys, pebbles, carborundum, mullite, zirconium oxide, fused alumina and the like. For coking processes the solid material may consist of a low activity clay catalyst, petroleum coke or porous inert material such as pumice. The contact material may be in the form of pellets, spheres, tablets or irregular shaped particles and it should be understood that the term "granular" is employed broadly herein as covering any of the above. The contact material granules may range in size from about one-half inch to 80 mesh Tyler, and preferably should be of the order of 4 to 20 mesh size.

This invention is concerned with an improved system for conducting reactions of the type discussed above in the presence of a cyclically moving granular contact material and particularly with the contact material circulation part of such system.

Heretofore, it has been customary in commercial installations to position the reaction and regeneration vessels side by side and to circulate contact material between the vessels in bucket elevators. Such elevators are unsatisfactory for extremely high temperature operations due to mechanical failure and also impose undesirable practical limitations on the maximum rate of contact material circulation. It has been proposed in the prior art to withdraw contact material from one of the contacting vessels through a throttled outlet pipe and then suspend it in a stream of gas maintained under pressure by which it is lifted to the other contacting zone. The lift gas in such proposed systems is provided by a compressor and due to the very substantial pressure drop across the lift pipe, the power requirements for such lift systems is very high. Also, since there is a substantial pressure at the lower end of the lift stream a serious problem arises in attempting to introduce the contact material into the lift gas stream, particularly when the contacting zone from which it passes to the lift stream is operating at a low pressure. In such operations in order to accomplish the contact material injection into the lift gas stream it has been suggested that mechanical forced feed devices may be employed. Such devices are undesirable because of the probability of their mechanical failure under the very high operating temperatures required by many conversion processes and because of the high contact material attrition losses resulting from the use of such forced feed devices. Also, it has been suggested that a great enough head of contact material can be maintained in the pipe connecting the lower end of the gas lift pipe with the contacting zone to permit the contact material to flow by gravity into the gas lift pipe. Such prior art systems require that the connection between the gas lift and the contacting zone feeding it be gas tight, and that the entire set of conversion and regeneration vessels be positioned at a substantially higher level above the ground than is the case when elevators are employed in order to leave room for a sufficiently long gravity feed leg to the lift pipe. This latter requirement is obviously a serious disadvantage because it results in a material increase in support structure costs and renders the entire unit less easily accessible. Also, since there is a continuous non-vented pipe between the contacting vessel and the gas lift pipe flexibility of operation is lost. In operation, the lift pipe must be carefully controlled within relatively narrow pressure ranges which will not upset the operation of the contacting vessels. Likewise, the lift pipe operation imposes serious limitations on the amount of differential in pressure which can be maintained between reactor and regenerator.

It is a major object of this invention to provide an improved method and apparatus for conducting hydrocarbon conversion in the presence of moving granular contact material.

A specific object is the provision in a process wherein granular contact material is passed cyclically through reaction and reconditioning zones in which it flows as a compact bed of gravitating material of an improved method and apparatus for accomplishing the contact material circulation which method and apparatus overcomes the disadvantages of the prior art systems discussed hereinabove.

These and other objects of this invention will become readily apparent from the following discussion.

In one form of this invention contact material is withdrawn from the bottom of one of the contacting vessels of the cyclic system and passed as a compact gravitating stream to a depressuring zone wherein pressure on the stream is reduced substantially to atmospheric pressure. The contact material then flows downwardly as a substantially compact feed stream or column, vertical along at least most of its length, until it reaches a location or zone where it is mixed with a stream of lift gas. The contact material is carried upwardly by the lift gas as a confined lift stream of greater vertical length than the compact feed stream into a separator located at a level substantially above the vented upper end of the compact feed stream. The lift gas is separated from the contact material and withdrawn from the separation zone at a pressure near atmospheric. The separated contact material is then passed in series through as many additional sets of similar feed streams and similar lift streams as is required to lift it to a location from which it may flow by gravity onto the bed of contact material maintained in the other contacting zone of the cyclic system. In this method the successive separation zones are at progressively higher levels by virtue of the fact that the lift streams are of greater vertical length than the compact feed streams. This is accomplished by controlling the rate of contact material and lift gas entry into the lower end of each lift stream so as to maintain the ratio of the contact material stream density in each compact feed stream to that in the immediately following lift stream at least equal to the inverse ratio of the vertical lengths of these streams. At the same time the lift gas pressure at the zone of mixing is below that which would force sufficient gas to flow up through the feed stream to interfere with the downward contact material flow and the compactness of the feed stream.

This invention may be more readily understood by reference to the drawings attached hereto of which Figure 1 is an elevational view, partly in section, of one arrangement for conducting this invention and Figure 2 is a similar view of a modified arrangement. Both of these drawings are highly diagrammatic in form.

Turning now to Figure 1, we find a conversion vessel 10 positioned above a reconditioning vessel 11. The conversion vessel is provided with a reactant inlet 14 at its upper end and a reaction outlet 15 near its lower end. A purge gas inlet 16 is provided below the reactant inlet. Suitable gas handling devices may be provided within the vessel in association with conduits 15 and 16. A gas lift pipe 17 extends into the upper section of the vessel 10, terminating just below the deflection baffle 18. An outlet conduit 13 for contact material extends down from the bottom of vessel 10 into the seal chamber 19. A conduit 20 extends down from the bottom of chamber 19 to vessel 11. A seal gas inlet 21 connects into the top of the seal chamber 19. The reconditioning vessel 11 is provided with a gas inlet 22 at an intermediate level and gas outlets 23 and 24 near its opposite ends. An outlet pipe 55 for contact material extends down from the bottom of vessel 11 into the upper section of a depressuring chamber 25. The internal construction of the reconditioning vessel may vary widely depending upon the particular process involved. When the reconditioning step involves catalyst regeneration by contaminant burning, heat transfer tubes may be provided at one or more levels to aid in control of the contact material temperature. Heat transfer fluid may be supplied to these tubes via conduit 50 and withdrawn therefrom via conduit 51. In some operations where the hydrocarbon charge is thermally converted in presence of an inert heat carrying solid material, the purpose of the vessel 11 may be merely to add or abstract heat to or from the contact material in which event the vessel 11 may take any of a number of suitable forms well known to the art. The depressuring chamber 25 is provided with a gas outlet 26 at its upper end. A conduit 27 extends downwardly from the lower end of chamber 25 into the top of a lift feed tank 28 located a substantial distance below chamber 25. The conduit 27 should be vertical along at least most of its length and should have a slope great enough to insure its being filled with contact material at every location along its length. In general, its slope should not be less than about 45 degrees at any point. The conduit 27 should be preferably tapered so as to be of greater diameter at its upper end than at its lower end. A vertical lift pipe 29 extends up from an intermediate level within the feed tank 28 to a separator 30 positioned at a level substantially above the depressuring chamber. The separator may take any of a number of forms adapted for gas-solid separation, the one shown being of the impactless type in which the gas velocity is decreased so that the contact material settles. A cylindrical baffle 31 depends from the top of the separator and extends down below the upper end of the lift pipe. A gas outlet 32 is provided near the upper end of the separator. A conduit 33 extends down from separator 30 to a second feed tank 34 and a second lift pipe 17 extends up from within the tank 34 to a level within the upper section of convertor 10. Gas inlets 35 and 136 extend upwardly through the bottom of the feed tanks 28 and 34 respectively and terminate directly below the lower ends of lift pipes 29 and 17 respectively. A movable sleeve 56 flared outwardly on its lower end is provided around the lower end of lift pipe 29. The sleeve may be raised or lowered by means of screw cranks 36 and 37 which fit through lugs 38 and 39 respectively attached to opposite sides of the sleeve. A similar movable sleeve 40 is provided around the lower end of lift pipe 17. A gas inlet 41 bearing a diaphragm operated valve 42 connects into the top of feed tank 34. This valve is actuated by a differential pressure controller 43.

As typical of the operation according to this invention, its application to a catalytic cracking process may be taken as typical. Catalyst at a suitable reaction temperature within the range about 800–1100° F. passes down through vessel 10 as a substantially compact bed 60. A suitable fluid reactant charge such as a liquid phase reduced crude or a vaporized gas oil cut heated to about 800–900° F. may be introduced into the reactor above baffle 18 via conduit 14. This charge passes down through the column 60 and is converted to a lower boiling gasiform, gasoline containing product which is withdrawn separately of the catalyst from the lower section of conversion zone 10, via conduit 15. The gaseous pressure in the reactor may be of the order of 6 pounds per square inch gauge at its upper end and 5 pounds at its lower end. It is to be understood that the term gasiform as employed herein in describing and claiming this invention is used in a broad sense as meaning material existing in the gaseous phase under the conditions of temperature and pressure involved regardless of what may be its normal phase at atmospheric conditions. The used catalyst is purged free of gasiform products by an inert gas such as steam or flue gas supplied via pipe 16 and then passes via conduit 13 into seal zone 19 which is maintained under an inert gaseous pressure greater than that in convertor 10 by means of a seal gas such as steam or flue gas introduced via pipe 21. A differential pressure controller may be provided to operate a valve on pipe 21 for this purpose. The pressure in seal zone 19 may be maintained at about 5½ pounds per square inch gauge for example. Contact material flows as a compact stream via pipe 20 into vessel 11 in which the pressure may be of the order of 1–2 pounds per square inch gauge. Air is supplied via conduit 22 into the vessel 11 and passes in part up through the bed therein to outlet 23 and in part down through the bed to outlet 24. A suitable heat exchange fluid such as a low melting point molten alloy or a suitable inorganic salt mixture, or steam is supplied via pipe 50 to tubes within the vessel 11 for the purpose of removing excess regeneration heat by indirect heat transfer. The heat exchange fluid may be withdrawn via pipe 51. Since high catalyst circulation rates are made feasible by the method of this invention, heat transfer tubes usually need be provided only at one level in the vessel 11 or they may be eliminated entirely. Regenerated catalyst passes as a compact stream from the vessel 11 into the depressuring zone where it is delivered onto a bed maintained therein. The pipe 55 is of relatively small diameter and of sufficient length to prevent excessive loss of gas from vessel 11 with the discharged catalyst. Any gas leaving the vessel 11 via pipe 55 and any gas rising into chamber 25 from feed tank 28 is withdrawn from above the bed level in chamber 25 via conduit 26. The pipe 26 discharges directly to the atmosphere or into a low pressure separation zone or the like so that the pressure is maintained near atmospheric above the bed surface in chamber 25. This bed surface forms in effect the surface of a substantially compact feed stream or column which extends on down through conduit 27 onto the bed 61 in tank 28. The bed 61 is also a substantially compact continuation of the feed stream and delivers contact material to a gas-solid mixing zone or lift feeding zone which exists in the lower part of tank 28 in the region below the sleeve 56. Here an inert lift gas such as steam, flue gas, nitrogen, etc. is supplied via pipe 35 so as to mix with the catalyst and carry it in suspension as a confined lift stream up through pipe 29. The stream in pipe 29 is of substantially greater vertical height than is the compact feed stream extending down from chamber 25 so that the contact material discharged into separator 30 has been in effect transferred to a higher level by the combined feed stream and lift stream operation. It is usually desirable to maintain the separator 30 at a pressure near that in chamber 25 and preferably near atmospheric. There is a pressure drop due to flow through pipe 29 which shows up as a gaseous pressure in the gas-solid mixing zone below sleeve 56. The length of vertical feed stream extending up from this zone to the surface of the bed in the depressuring chamber should be sufficient to create a head of contact material greater than the gaseous pressure in the gas-solid mixing zone. By vertical head of catalyst column and similar expressions is meant that head which may be calculated by dividing the total weight of contact material in the vertical part of the column above its lower end by the cross-sectional area of the column. A small amount of gas from tank 28 passes upwardly through the void space between particles in the compact feed stream 27. The length of feed stream 27 should be great enough to restrict the velocity of gas flow therethrough below that which would substantially effect the compactness of the feed stream or interfere with the downward solid flow. This requires that the pressure drop in pounds per square inch per unit length of vertical column must be less than the calculated weight of the solid material in that length of column per square inch of its cross-sectional area. For example, for a material of 40 pounds per cubic foot compact flowing stream density the pressure drop due to gas flow per foot of vertical column height must be less than $$\frac{40 \times 1}{144} = .277$$

pounds per square inch. It will be understood that a compact feed stream creates substantially no hydrostatic head at its lower end of the type created by a vertical standpipe of powdered solids maintained in aerated or fluidized condition. However in estimating the length of feed stream required to permit compact stream flow against gaseous pressure it is convenient to express the required leg length in terms of a "calculated head." For short feed streams the calculated head is the quotient of the total weight of contact material in the vertical part of the feed stream above its lower end divided by the horizontal cross-sectional area of the stream. When relatively long streams are required in order to overcome relatively high pressure drops it is necessary to taper the feed leg so that its diameter gradually increases at successively higher levels in order to compensate for the effect of gas expansion as it reaches the lower pressure section of the pipe. A tapered feed leg of this type is the subject of claims in United States patent application Serial Number 488,686, filed May 27, 1943. When a tapered leg is employed, the "calculated head" is the weight of solid particles in the vertical portion of the stream above its lower end divided by the average horizontal cross-sectional area of the stream. If the stream is not vertical much higher lengths are required to permit proper gravity flow against pressure than in the case of vertical feed streams. In general feed streams which are entirely vertical are preferred and if a portion of the feed stream slopes it should be of substantially greater diameter than the vertical portion of the streams. In the arrangement shown in Figure 1, unless the bed 61 is of considerable depth, it may be ignored in calculating catalyst head and the head exerted on the lower end of pipe 27 may be considered the head in the feed stream.

The pressure drop across the lift pipe 29 is dependent on several factors such as the weight or head of the catalyst in the lift pipe, the gas expansion loss, the frictional losses resulting from catalyst and gas movement through the lift and movement relative to each other and the energy required to accelerate the catalyst particles. While I do not consider my invention as being limited thereto in its broader aspects, I prefer to operate the lift apparatus so that the gas velocity is relatively low and the stream density is relatively high, for example 15–35 pounds per cubic foot for a granular catalyst having a 40 pound per cubic foot packed density. Under these conditions the head of catalyst in the lift stream accounts for by far the greater portion of the pressure drop across the lift pipe, and at the higher stream densities other factors may be ignored for practical purposes. It has been found that in order to be able to effect transfer of catalyst up through the lift pipe 29 in feasible amounts, the rate of gas and catalyst entry into the lower end of the lift pipe must be controlled to maintain the stream density in the lift pipe 29 such that the quotient obtained by dividing the stream density in the feed pipe 27 by the stream density in lift pipe 29 is never less than the quotient obtained by dividing the vertical length of the lift stream by the vertical length of the feed stream. Thus, as an example, the feed stream from the bed surface in chamber 25 to the lower end of pipe 27 may be 35 feet in vertical height and the feed stream density may be about 45 pounds per cubic foot for an inorganic oxide gel catalyst. Theoretically, the head in the feed stream in this example would amount to about 10.9 pounds per square inch and the pressure in tank 28 should never rise above this value or the catalyst feed will fail. Assume that in this arrangement the lift pipe is 95 feet in length, under these conditions the catalyst stream density within the lift pipe should never be permitted to rise above about 16.5 pounds per cubic foot. If it is desired to increase the lift stream density, then the length of pipe 29 relative to pipe 27 should be decreased. Usually it is desired to provide a suitable operating factor of safety for the compact feed stream so that in the above example it is preferred to maintain the pressure in the feed tank 1–2 pounds per square inch lower than the 10.9 pounds per square inch maximum. Also, where the frictional factors in the lift stream account for a substantial part of the pressure drop, this should be taken into account by maintaining a lower lift stream density than the critical maximum discussed above. Thus, in the above example the lift stream density might be maintained at about 10–12 pounds per cubic foot. The gas inlet rate to pipe 29 may be controlled by valve 63 on gas inlet pipe 35. The rate of catalyst entry into pipe 29 may be controlled principally by raising and lowering the sleeve 56 which in effect changes the distance between the gas inlet pipe 35 and the effective lower end of the gas lift pipe. In general, as the sleeve 56 is lowered the rate of catalyst entry into pipe 29 decreases, the gas rate being constant. This means that if the gas rate is maintained constant and the sleeve 56 is lowered, the density of the catalyst stream in lift pipe 29 is decreased. Catalyst discharged from the pipe 29 into separator 30 settles and passes as a compact stream to feed tank 34 and is similarly lifted from the lower section of tank 34 up through lift pipe 17 into the convertor 10. The lift gas in this case may be a vaporized hydrocarbon reactant introduced via pipe 36. This hydrocarbon charge passes down through the bed in the convertor along with that supplied via conduit 14. The vertical length of the second compact feed stream may be 55 feet for example, and the pressure of the lift gas in tank 34 may be 150 pounds per square inch gauge. Part of this pressure is used to balance the six pounds pressure in the convertor and the remainder is used to lift the contact material up through the pipe 17 which has a vertical height of about 160 feet. In order to prevent escape of hydrocarbons up through the pipe 33, an inert seal gas such as steam or flue gas is introduced via pipe 41 into the top of tank 34 so as to maintain a seal gas pressure above the bed of catalyst in tank 34 about one-quarter to one-half pound higher than the gaseous pressure near the bottom of tank 34. If desired, suitable means may be provided for controlling the bed level in convertor 10, but when the operation is uniform the bed level is self sustaining, except for a small drop due to catalyst loss from the system. This loss may be compensated by adding fresh make up catalyst via conduit 70 as needed.

If desired, the lifting operation may be conducted in more than two stages as is shown in Figure 2. Turning to Figure 2, a regenerator 80 is shown positioned vertically above a convertor 81 and connected thereto via catalyst flow conduit 82. Air enters the regenerator at its lower end via pipe 83 and flue gas is withdrawn near its upper end via pipe 84. Catalyst passes down from the regenerator which may be operating under a pressure of 3 pounds per square inch gauge, for example, through the 10–15 foot long gravity feed leg 82 into a seal zone 85 located in the upper end of vessel 81. A seal gas introduced at 186 provides an inert seal blanket adjacent the lower end of leg 82. Reactant enters the lower section of the convertor via pipe 86 and gasiform product is withdrawn via pipe 87. The gaseous pressure in the reactor may range from 7 pounds gauge at its lower end to 5 pounds gauge at its upper end. Catalyst passes from the bottom of the reactor as a compact stream in pipe 88 to depressuring chamber 25 where the pressure is reduced substantially to atmospheric. The catalyst flows from chamber 25 onto the open surface of vertical feed column 89 and is delivered from the lower end of column 89 into the tank 90. Catalyst is lifted from tank 90 via lift gas supplied into the bottom of the feed tank at 91 up through the lift pipe 92 to the separator 30. In the present example, the feed column 89 may be only about 15 feet long from its surface to the level in tank 90 where the contact material is mixed with lift gas. The pressure just under sleeve 56 may be about 3 pounds per square inch gauge and the lift pipe 92 may be about 45 feet long. A small amount of lift gas passes upwardly through the compact column 89 and escapes to the atmosphere at its upper end. The contact material is separated from the lift gas in separator 30, which is vented to atmospheric pressure via conduit 32. The contact material flows from the separator 30 onto the open column 100 through which it flows downwardly as a substantially compact mass until it is induced by the lift gas supplied via pipe 101 to flow up through the second lift pipe 102 to separator 104. The column 100 may be about 23 feet in length and the lift pipe 80 may be 70 feet in length so that the contact material is lifted a net of 48 feet above the column surface. The inert lift gas pressure near the lower end of column 100 may be about 5 pounds per square inch. The rate of contact material entry into lift pipe 103 is controlled by raising or lowering sleeve 150 which fits around gas inlet pipe 101 and is operated from outside of the column 100 by means of rod 151. Set screw 152 is provided to hold the rod in place when the sleeve has been set at the desired level. In general the rate of contact material entry into lift pipe 103 decreases as the sleeve 150 is raised toward the lower end of the lift pipe. Contact material is again separated from lift gas in separator 104 and passes down through the 35 foot long column 105 to the mixing zone near its lower end from which it is carried by lift gas entering at 106 up through the final lift pipe 107 which is about 120 feet in vertical height. The gaseous pressure at the lower end of column 105 is of the order of 8 pounds per square inch gauge. The contact material is discharged into separator 108, which is positioned at a location from which contact material may flow by gravity onto the bed 109 in the regenerator 80. The separator 108 may be maintained at about 1 pound per square inch gauge pressure. It should be understood that the expression "location from which it may flow downwardly onto the bed in the contacting zone" and similar expressions as employed herein in claiming this invention are intended to broadly cover delivery of contact material from the final lift pipe into an external separator located similarly to separator 108 of Figure 2 or delivery of contact material directly into the upper section of the contacting chamber above the compact bed surface therein. Contact material separated from the lift gas passes downwardly through leg 111 onto the bed in surge zone 112 from which it flows through pipes 113 onto the bed 109 in the regeneration zone. The surge zone 112 should be deep enough to allow for a fluctuation of the bed level therein over a range of several feet. A level indicator (not shown) may be provided in the surge zone. Make up contact material to replace fines lost from the system may be added at the top of leg 89 or leg 100.

In the above example, the contact material is lifted a net of about 150–165 feet above the level of depressuring chamber 25 by means of a gas lift arrangement which may be operated independently of the operation in the reaction and regeneration zones thereby permitting considerable flexibility of operation both in the gas lift steps and in the reaction and regeneration zones. Moreover, this is accomplished without the necessity for providing apparatus extending more than about 15 feet below the depressuring chamber 25, thereby avoiding one of the principal disadvantages of the prior art systems.

It should be understood that the invention is not to be considered as limited to the particular examples of dimensions and operating conditions given hereinabove. The number of gas lift units employed in series depends upon the particular requirements of the operation involved. In some operations in order to maintain attrition losses at a minimum, it is desirable to maintain the density of contact material stream in the lift pipes as high as is possible while still effecting its upward transfer. In such operations in order to prevent the initial gravity feed legs from being very long and thereby greatly increasing the overall height of the entire cracking unit it may be desirable to employ three or more sets of gravity legs and gas lifts with gas separators between successive sets. In all cases any given separator in the successive sets is higher than the preceeding separator. This need not be true, however, of the level of the lower ends of successive feed columns. It is generally desirable to maintain the separators all at about atmospheric pressure although it is contemplated within the broader scope of this invention that the pressure in the separators may be above or below atmospheric and that it may be different in different separators in the series. It is further contemplated that within the broader scope of this invention the two contacting vessels may be arranged differently relative to each other than described hereinabove. For example, the convertor and reconditioner may be positioned side by side in which case two complete gas lift systems will be required instead of one as is shown in Figures 1 and 2.

In its broadest form, the invention is not limited to any particular range of gas velocities or contact material stream densities in the lift pipes but it is preferred that the linear upward gas velocity be within the range about 80 to 130 feet per second and that the stream density be within the range about 6 to 30 pounds per cubic foot on the basis of a contact material having a compact flowing density of about 45 pounds per cubic foot and a particle size of about 4–16 mesh Tyler. In the gravity feed legs, the contact material should be maintained in substantially compact condition unsuspended in gas except possibly for a small percentage of fines. The rate of contact material flow in the feed legs is controlled by the rate of contact material entry into the gas lift pipes and the feed legs are replenished at their upper ends by a compact stream of contact material from the lower contacting zone so that there is in effect continuity of contact material stream compactness all the way upward from the level of contact material entry into the first lift pipe to and through the contacting zone thereabove. The contact material feed leg flow should obey the ordinary laws of granular solid material flow exhibiting an angle of repose and an angle of internal flow. This state of flow should be distinguished from the so-called dense fluidized phase in which the contact material is actually in gaseous suspension and follows many of the laws of liquid flow.

It should be understood that the examples of process application of this invention and of operation conditions are merely illustrative and are not to be construed as limiting the scope of this invention except as it may be limited by the following claims.

I claim:

1. In a hydrocarbon conversion process in which a granular contact material is passed cyclically through two contacting zones in each of which it is maintained as a substantially compact bed of gravitating contact material and in one of which it is contacted with a hydrocarbon charge to effect its conversion while in the other of which zones it is contacted with a suitable reconditioning gas to recondition it for reuse in the other contacting zone, the improved method of transferring the contact material from the bottom of one of said contacting zones upward into the upper section of the other of said contacting zones which comprises: withdrawing the contact material downwardly from the bottom of one of said contacting zones as a substantially compact stream, passing the withdrawn contact material in series through a plurality of alternating communicating descending and rising legs, each rising leg being of longer length than the next preceding descending leg and each rising leg having its upper end at a substantially higher level than the upper end of the preceding rising leg, the granular contact material flowing downwardly by gravity as a substantially compact column in each descending leg to a communication zone where the granules are suspended in a suitable lift gas and carried in suspension up through the following rising leg, the columns in said descending legs creating substantially no hydrostatic head at their lower ends, supplying lift gas to each of said communicating zones which communicate the lower ends of successive descending and rising legs to effect the suspension of said granular contact material as aforesaid, controlling the gaseous pressure in each communicating zone substantially above that at the upper end of the descending leg communicating thereinto and below the value of the quotient obtained by dividing the weight of contact material in the vertical portion of the descending leg communicating said communicating zone by the average horizontal cross-sectional area of said descending leg, whereby a small amount of gas is forced upwardly through said descending leg at a rate insufficient to affect the compactness of said descending leg, maintaining the length of said first descending leg substantially below that at which said quotient would equal the value of the pressure which would be required to lift the contact material under similar conditions in the rising leg from said first communicating zone to any level above said bed in the other of said contacting zones, and maintaining the ratio of the contact material stream density in each descending leg and the rising leg following it at least equal to the inverse ratio of the vertical lengths of said legs, discharging contact material from the last rising leg in said series and flowing it downwardly onto the bed in the other of said contacting zones.

2. In a process for conversion of hydrocarbons wherein a granular contact material comprising granules within the size range about ½ inch to 80 mesh Tyler is passed cyclically through two contacting zones, one of said zones being a reaction zone wherein the contact material is contacted with a fluid hydrocarbon charge to effect conversion thereof and the other of said zones being a reconditioning zone in which the contact material is contacted with a suitable reconditioning gas to effect its reconditioning for reuse in said reaction zone, the improved method of transferring contact material from one of said contacting zones to the other which comprises: passing granular contact material from the bottom of one of said contacting zones as a substantially compact gravitating stream onto the surface of an upright substantially compact column of said contact material, which column is substantially vertical along at least most of its length and creates substantially no hydrostatic head at its lower end, maintaining the pressure substantially atmospheric at the upper end of said column, causing the granules of contact material near the lower end of said column to become suspended in a stream of suitable lift gas maintained at a pressure substantially above that at the upper end of said compact column and below that corresponding to the calculated head of contact material in said first column as calculated by dividing the weight of material in the vertical portion of said column by its average horizontal cross-sectional area, passing the stream of lift gas and suspended granules of contact material upwardly as a confined lift stream into a separation zone maintained near atmospheric pressure and positioned a substantial distance above the upper end of said first feed column, controlling the rate of contact material and lift gas supply to said lift stream to maintain the density of said stream sufficiently below that of said first feed column to permit the contact material to be lifted to said separation zone by said lift gas under a pressure less than that corresponding to the calculated head of contact material in said first column, the pressure in said stream of lift gas at the point of initial contact with said contact material being substantially below that which would be required to lift said contact material under similar lift stream conditions to any level above the other of said contacting zones and the vertical length of said first column being substantially less than that which would provide a calculated head of contact material as great as said required pressure, separating lift gas from the contact material in said separation zone and dropping the separated contact material onto a second substantially compact feed column having its upper end at a higher level than said first feed column, causing contact material near the lower end of said second feed column to become suspended in a suitable lift gas and passing the lift gas and suspended contact material as a second confined lift stream upwardly to a location substantially above said separation zone maintained at a superatmospheric pressure near the superatmospheric pressure in said other of said contacting zones, from which location it may flow downwardly into the upper section of said other contacting zone without the requirement of compact gravity feed column of such length as would be required to feed contact material into said zone from a location thereabove maintained at atmospheric pressure, supplying the gas to said second lift stream at a pressure below that corresponding to the calculated head of contact material in said second compact feed column and controlling the rate of contact material and lift gas supply to said second lift stream to maintain the contact material density in said second lift stream sufficiently below that in said second feed column to permit the contact material to be lifted as aforesaid.

3. The improved method for transferring granular contact material from one level to a substantially higher receiving level which comprises, passing the granular contact material from the lower level in series through a plurality of alternating communicating descending and rising legs, at least most of the successive rising legs being of longer length than the next preceding descending leg and discharging the contact material at a higher elevational level than the preceding rising leg the granular contact material flowing downwardly by gravity as a substantially compact column in each descending leg to a communication zone where the granules are suspended in a suitable lift gas and carried in suspension up through the following rising leg, the columns in said descending legs creating substantially no hydrostatic head at their lower ends, supplying lift gas to each of said communicating zones which communicate the lower ends of successive descending and rising legs to effect the suspension of said granular contact material as aforesaid, controlling the gaseous pressure in each communicating zone substantially above that at the upper end of the descending leg communicating thereinto and below the value of the quotient obtained by dividing the weight of contact material in the vertical portion of the descending leg communicating said communicating zone by the average horizontal cross-sectional area of said descending leg, whereby a small amount of gas is forced upwardly through said descending leg at a rate insufficient to affect the compactness of said descending leg, maintaining the length of said first descending leg substantially below that at which said quotient would equal the value of the pressure which would be required to lift the contact material under similar conditions in the rising leg from said first communicating zone to said higher receiving level, and maintaining the ratio of the contact material stream density in each descending leg and the rising leg following it at least equal to the inverse ratio of the vertical lengths of said legs, discharging the contact material from the last rising leg above said higher receiving level and flowing it downwardly thereto.

4. In a hydrocarbon conversion process in which a granular contact material is passed cyclically through two contacting zones in each of which it is maintained as a substantially compact bed of gravitating contact material and in one of which it is contacted with a hydrocarbon charge to effect its conversion while in the other of which zones it is contacted with a suitable reconditioning gas to recondition it for reuse in the other contacting zone, the improved method of transferring the contact material from the bottom of one of said contacting zones upward into the upper section of the other of said contacting zones which comprises: withdrawing the contact material downwardly from the bottom of one of said contacting zones as a substantially compact stream, passing the withdrawn contact material in series through a plurality of alternating communicating descending and rising legs, at least most of the successive rising legs being longer than the immediately preceding descending leg and discharging contact material at a higher level than the preceding rising legs, the granular contact material flowing downwardly by gravity as a substantially compact column in each descending leg to a communication zone where the granules are suspended in a suitable lift gas and carried in suspension up through the following rising leg, said descending legs being maintained in such compacted condition that substantially no hydrostatic pressure is created at their lower ends and said descending legs being tapered along their length so that the horizontal cross-sectional area thereof becomes progressively less at successively lower levels, the first of said descending legs being vented at its upper end to a location of lower pressure than the communication zone at its lower end, supplying lift gas to each of said communicating zones which communicate the lower ends of successive descending and rising legs to effect the suspension of said granular contact material as aforesaid, controlling the gaseous pressure in each communicating zone substantially above that at the upper end of the descending leg communicating thereinto and below the value of the quotient obtained by dividing the weight of contact material in the vertical portion of the descending leg communicating said communicating zone by the average horizontal cross-sectional area of said descending leg, whereby a small amount of gas is forced upwardly through said descending leg at a rate insufficient to affect the compactness of said descending leg, maintaining the length of said first descending leg substantially below that at which said quotient would equal the value of the pressure which would be required to lift the contact material under similar conditions in the rising leg from said first communicating zone to any level above said bed in the other of said contacting zones, and maintaining the ratio of the contact material stream density in each descending leg and the rising leg following it at least equal to the inverse ratio of the vertical lengths of said legs, discharging contact material from the last rising leg in said series and flowing it downwardly onto the bed in the other of said contacting zones.

5. In a hydrocarbon conversion process in which a granular contact material is passed downwardly through two contacting zones arranged in series one above the other, the contact material flow in each of said zones being as a substantially compact bed and at least the upper zone being maintained under superatmospheric pressure, and in which the contact material is contacted in one of said zones with a fluid hydrocarbon charge to effect conversion thereof and in the other of said zones with an oxygen containing gas to burn off from the contact material a carbonaceous contaminant deposited thereon during the hydrocarbon conversion, the improved method for transferring the contact material from the lowermost of said zones back to the uppermost of said zones which method comprises: flowing the contact material downwardly as a substantially compact stream from the bottom of said lowermost contacting zone to a zone which is maintained substantially at atmospheric pressure; flowing the contact material downwardly from said last named zone as a substantially compact feed stream, vertical along at least most of its length, to a lift feed zone, supplying a suitable lift gas to said lift feed zone to effect suspension of the granules of contact material and carry it upwardly as a confined lift stream of substantially greater vertical length than said feed stream to a separation zone, maintaining the gaseous pressure in said feed zone substantially above that at the upper end of said feed stream and below the value of the quotient obtained by dividing the weight of contact material in the vertical portion of said feed stream by the average horizontal cross sectional area of said feed stream, whereby a small amount of gas is forced upwardly through said feed stream to said low pressure zone at a rate insufficient to interfere with the downward compact stream flow in said feed stream, withdrawing said gas from said low pressure zone, restricting the length of said feed stream below that at which said quotient would equal the value of the pressure which would be required to lift the contact material from said first feed zone to any level above the other of said contacting zones, controlling the rate of gas and contact material entry into said lift stream to maintain the feed stream contact material density not less in proportion to the lift stream density than is the vertical length of the lift stream to the vertical length of the feed stream, separating the lift gas from the contact material in said separation zone and passing the contact material in series through at least one additional similar feed stream and lift stream in a manner similar to its passage through said first named feed and lift streams, each successive lift stream discharging the contact material at a higher elevational level than the preceding lift stream until the contact material is discharged from the last lift stream at a superatmospheric pressure near that in the uppermost contacting zone and at a location above the bed surface level in said uppermost contacting zone and flowing the contact material downwardly onto said bed in said uppermost contacting zone, said location of discharge being spaced above the level of the bed in said uppermost contacting zone a substantially shorter vertical distance than would be required for gravitation of the contact material onto said bed from a location maintained at atmospheric pressure.

6. In a hydrocarbon conversion process in which a granular contact material is passed cyclically through two contacting zones in each of which it is maintained as a substantially compact bed of gravitating contact material and in one of which it is contacted with a hydrocarbon charge to effect its conversion while in the other of which zones it is contacted with a suitable reconditioning gas to recondition it for reuse in the other contacting zone, the improved method of transferring the contact material from the bottom of said reconditioning zone to the conversion zone which comprises: passing the contact material from the bottom of said reconditioning zone downwardly as a substantially compact stream, vertical along at least a major portion of its length, to a gas-solid mixing zone adjacent the lower end of said feed column, supplying a suitable inert lift gas into said mixing zone to mix with the contact material granules and carry the same in suspension as a confined lift stream up to a separation zone located substantially above the level of said feed stream, maintaining the gaseous pressure in said feed zone substantially above that at the upper end of said feed stream but below the value of the quotient obtained by dividing the weight of contact material in said feed stream by the average horizontal cross-sectional area of said feed stream, limiting said feed stream to a length in which the value of said quotient is substantially below the pressure which would be required to lift the contact material from said mixing zone to the upper section of said reaction zone, controlling the rate of gas and contact material entry into said lift stream to maintain the lift stream contact material density not less in proportion to the feed stream density than is the vertical length of the feed stream to the vertical length of the lift stream, separating the lift gas from the contact material in said separation zone and passing the contact material in series through at least one additional similar but substantially longer feed stream and lift stream in a manner similar to its passage through said first named feed and lift streams, at least most of the successive lift streams discharging the contact material at a higher elevational level than the preceding lift stream and the last lift stream discharging the contact material directly into the conversion zone above the bed therein, supplying an inert lift gas to each lift stream except the last one and supplying a suitable gasiform hydrocarbon charge to the lower end of the last lift stream, and flowing said hydrocarbon charge after it discharges from the upper end of said last lift stream down through the bed in said conversion zone to effect its conversion to gasiform products and withdrawing said gasiform products from the lower section of said conversion zone separately of the contact material.

References Cited in the file of this patent

UNITED STATES PATENTS

| Number | Name | Date |
|---|---|---|
| 532,699 | Pohle | Jan. 15, 1895 |
| 2,289,329 | Prickett | July 7, 1942 |
| 2,311,564 | Munday | Feb. 16, 1943 |
| 2,407,700 | Huff | Sept. 17, 1946 |
| 2,440,475 | Jacomini | Apr. 27, 1948 |
| 2,509,983 | Morrow | May 30, 1950 |
| 2,561,771 | Ardern | July 24, 1951 |
| 2,593,404 | Barker | Apr. 22, 1952 |
| 2,594,615 | Berg | Apr. 29, 1952 |